United States Patent
Lucz et al.

(10) Patent No.: US 8,378,564 B2
(45) Date of Patent: Feb. 19, 2013

(54) POSITIONING OF AUXILIARY AMALGAM

(75) Inventors: Peter Lucz, Budapest (HU); Sandor Lukacs, Budapest (HU); Laszlo Bankuti, Budapest (HU); Peter Mora, Budapest (HU)

(73) Assignee: General Electric Company, Schenectady, NY (US)

(*) Notice: Subject to any disclaimer, the term of this patent is extended or adjusted under 35 U.S.C. 154(b) by 174 days.

(21) Appl. No.: 12/796,727

(22) Filed: Jun. 9, 2010

(65) Prior Publication Data

US 2011/0304258 A1 Dec. 15, 2011

(51) Int. Cl.
*H01J 1/62* (2006.01)
*H01J 63/04* (2006.01)

(52) U.S. Cl. ........ 313/490; 313/485; 313/493; 313/546; 313/549; 313/550; 313/551; 313/564; 313/565; 313/566; 313/573; 313/634; 445/26; 445/29; 445/31

(58) Field of Classification Search ............ 313/56, 313/490, 550, 634, 493, 485, 546, 549, 564, 313/565, 566, 573; 445/26, 29, 31
See application file for complete search history.

(56) References Cited

U.S. PATENT DOCUMENTS

| | | | | |
|---|---|---|---|---|
| 4,871,944 A * | 10/1989 | Skwirut et al. | ............ | 315/56 |
| 5,739,433 A | 4/1998 | Beck | | |
| 6,417,615 B1 * | 7/2002 | Yasuda et al. | ........... | 313/490 |
| 6,476,553 B1 * | 11/2002 | Iida et al. | ............. | 313/550 |
| 7,876,052 B2 * | 1/2011 | Hollstein et al. | ........ | 313/634 |
| 2002/0019962 A1 | 2/2002 | Roberts et al. | | |
| 2002/0109462 A1 | 8/2002 | Nishio et al. | | |
| 2004/0183444 A1 * | 9/2004 | Nishio et al. | ........... | 313/634 |
| 2005/0104522 A1 | 5/2005 | Yabuki et al. | | |
| 2005/0231095 A1 * | 10/2005 | Beck et al. | ............. | 313/490 |
| 2006/0006784 A1 * | 1/2006 | Takahara et al. | ......... | 313/490 |
| 2008/0231160 A1 * | 9/2008 | Yan | ....................... | 313/44 |
| 2010/0181895 A1 * | 7/2010 | Nomura | .................. | 313/493 |

FOREIGN PATENT DOCUMENTS

| | | | |
|---|---|---|---|
| CN | 2604000 Y | | 2/2004 |
| CN | 201421827 Y | * | 3/2010 |
| JP | 2008-059947 A | | 3/2008 |
| JP | 2008059947 A | | 3/2008 |

OTHER PUBLICATIONS

English Language Abstracts of CN 201421827Y from EPO and Derwent.*
English Abstract of CN 2604000Y, Feb. 18, 2004.
English Abstract of WO2004081969 (A1), Sep. 23, 2004.
EP 11168367.8 Search Report and Written Opinion, Apr. 4, 2012.
Search Report and Written Opinion dated Apr. 4, 2012 from corresponding EP Application No. 11168367.8.

* cited by examiner

*Primary Examiner* — Nimeshkumar Patel
*Assistant Examiner* — Thomas A Hollweg
(74) *Attorney, Agent, or Firm* — Fay Sharpe LLP

(57) ABSTRACT

A compact fluorescent lamp includes a discharge tube such as a spiral discharge tube having a wall forming a discharge chamber between cathodes at first and second ends thereof. At least one auxiliary amalgam assembly is disposed in the discharge chamber at an intermediate region disposed between the first and second ends. The auxiliary amalgam assembly is secured at a location spaced from the inner wall of the discharge chamber.

15 Claims, 7 Drawing Sheets

POSITIONING OF AUXILIARY AMALGAM

BACKGROUND OF THE DISCLOSURE

The present disclosure relates generally to a low pressure mercury vapor discharge lamp and more particularly to a compact fluorescent lamp including an auxiliary amalgam for emitting mercury vapor during at least a starting period.

A wide variety of low-pressure discharge lamps are known in the art. Low pressure mercury vapor discharge lamps are efficient at converting supplied electrical energy into ultraviolet radiation at an optimal mercury vapor pressure. Lamps using an amalgam optimized for use in high temperature areas have the disadvantage of a longer warm-up or starting period than lamps using pure liquid mercury. The length of the starting period is dependent on the speed at which the mercury vapor pressure in the lamp increases because the lumen output of the lamp is dependent on the mercury vapor pressure in the lamp. The starting period is longer for amalgam containing lamps because the mercury vapor pressure is too low at lower temperatures usually present at start-up, typically in the range of about 0 degrees C. to about 50 degrees C. The mercury vapor pressure increases slowly and does not reach its proper level until the amalgam reaches the high temperatures. In contrast, the mercury vapor pressure of a liquid mercury dosed lamp is much higher than the mercury vapor pressure of the amalgam containing lamp at the lower temperature or at room temperature.

To improve warm-up characteristics of an amalgam containing lamp, an auxiliary amalgam is typically attached to each electrode stem so that the auxiliary amalgam emits mercury during the starting period. The auxiliary amalgam is heated by the cathode after ignition and emits mercury vapor to make up for the lack of mercury vapor during the starting period. The auxiliary amalgam typically used is preferably indium-mercury (In—Hg). The amalgam which controls the mercury vapor pressure during operation, except for the starting period, is typically called the main amalgam, in contrast with the auxiliary amalgam which controls the mercury vapor pressure during the starting period.

Amalgams containing low pressure mercury vapor discharge lamps have experienced varying degrees of success. Thus, a need exists for an improved low-pressure mercury vapor discharge lamp having improved warm-up characteristics.

SUMMARY OF THE DISCLOSURE

In one aspect, the present disclosure relates to a compact fluorescent lamp which includes a discharge tube having a wall which forms a discharge chamber between cathodes at first and second ends of the chamber. At least one auxiliary amalgam assembly is disposed in the discharge chamber at an intermediate region disposed between the first and second ends. The lamp further includes a mount that secures the auxiliary amalgam assembly at a location spaced from the inner wall of the discharge chamber.

In another aspect, the present disclosure relates to a method of positioning an auxiliary amalgam in a compact fluorescent lamp that includes providing a discharge tube having a wall forming a discharge chamber between first and second cathodes at opposite ends of the discharge chamber. The method further includes forming an opening in the wall between the ends. An auxiliary amalgam mounted on an elongate wire is positioned through the opening at a location spaced from the inner wall of the discharge tube. The method further includes sealing the opening.

In another aspect, the present disclosure relates to a compact fluorescent lamp which includes a discharge tube having a wall that forms a discharge chamber between cathodes at first and second ends thereof. An auxiliary amalgam is disposed in the discharge chamber between the first and second ends wherein the intermediate region is approximately midway between the first and second cathodes. A mount secures the auxiliary amalgam assembly at a location spaced from a sidewall in the discharge tube. The auxiliary amalgam assembly includes a bead.

Another benefit is an improved compact fluorescent lamp with decreased warm-up time during the service life of the lamp.

A primary benefit of the present disclosure is a more precise positioning of an auxiliary amalgam in a fluorescent lamp.

Still further advantages will become apparent to those of ordinary skill in the art upon reading and understanding the following detailed description of the preferred embodiment.

DETAILED DESCRIPTION OF THE PREFERRED EMBODIMENTS

Figure 1:
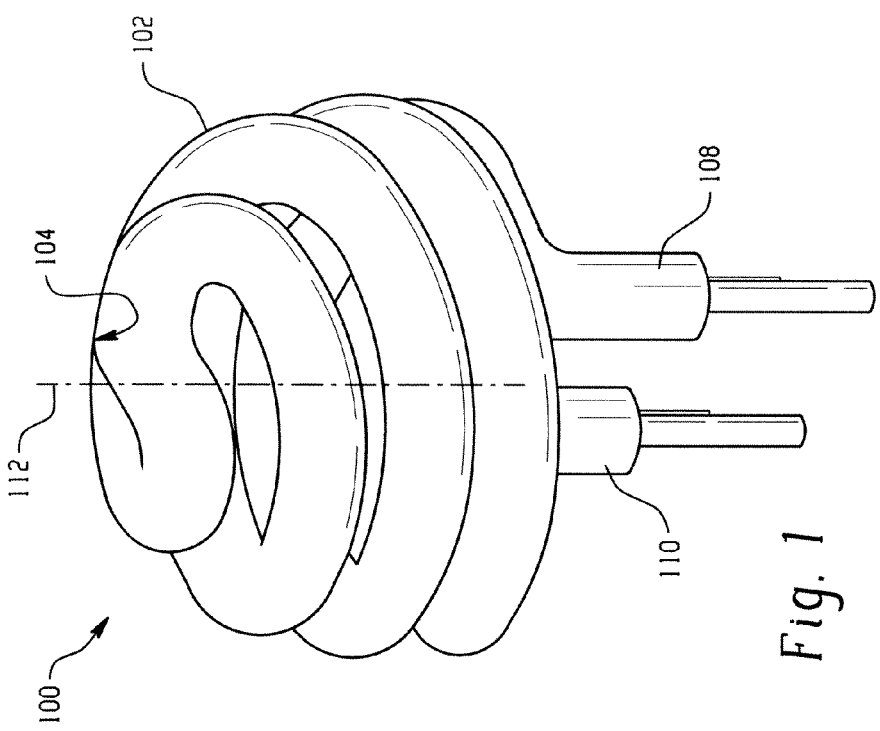
FIG. 1 is an axonometric view of a conventional compact fluorescent wire lamp.

FIG. 1 illustrates a fluorescent lamp such as a compact fluorescent lamp 100. The lamp 100 includes a sealed discharge tube or a light transmissive envelope 102, preferably formed of a material which is transmissive to radiation in the visible range and may also be transmissive to radiation in the IR range. Suitable materials for forming the envelope 102 include transparent materials such as quartz glass, and other vitreous materials, although translucent materials, such as ceramic materials, are also contemplated. The discharge tube 102 has a wall 104 which encloses a sealed volume or discharge chamber 106. As illustrated in FIG. 1, the discharge tube 102 is a single tube with substantially straight end sections 108, 110 and an intermediate portion has a coiled or spiral configuration wound about a principal axis 112 of the lamp to provide a substantially homogeneous illumination. At the ends 108, 110 of the discharge tube path, the tube is provided with cathodes (not shown) and lead-in wires (not shown) connected to the cathodes. The lead-in wires of the discharge tube are connected to a ballast unit (not shown) for controlling the current in the discharge tubes.

Alternatively, and although not illustrated, the discharge tube arrangement may be comprised of straight tube members in which the neighboring tube members are connected to each other in series to form a continuous arc path. The discharge tube arrangement may also comprise elongated discharge tube members bent to a U-shape of substantially the same length, which are interconnected by a bridge(s) to form a continuous arc path. Although it may be appreciated, elongated discharge tube members bent to a U-shape may not be of substantially the same length, e.g., special reflector lamps use very different lengths at the two sides.

In order to provide visible light, the internal surface of the discharge tubes is covered with a fluorescent phosphor layer (not shown). The composition of such a phosphor layer is generally known. This phosphor layer converts the short wave, mainly UVC radiation, into longer wave radiation in the spectrum of visible light.

A gaseous discharge till or fill gas is contained within the discharge chamber 104. The fill gas typically includes a noble gas such as argon or a mixture of argon and other noble gases such as xenon, krypton, and neon at a low pressure often in combination with a small quantity of mercury to provide a desired low vapor pressure for operation of the lamp 100. The noble gases may have only an indirect and small influence on the mercury vapor pressure. The gas till is responsible for the arc voltage (set up the mean free path of the electrons).

A main amalgam member (not shown) is provided within the discharge tube 102 and is oftentimes located in the first and second ends 108, 110. Typically, the amalgam is a metal alloy such as an alloy containing a bismuth-indium-mercury (Bi—In—Hg) composition. The main amalgam may also contain tin, zinc, silver, gold and combinations thereof. The particular composition is chosen to be compatible with the operating temperature characteristic of the location in the tube 102. As such, the alloy is generally ductile at temperatures of about 100° C. The alloy may become liquid at higher lamp operating temperatures. The main amalgam, once the lamp reaches working temperature, stabilizes the mercury vapor pressure during lamp operation by absorbing mercury vapor.

Figure 2:
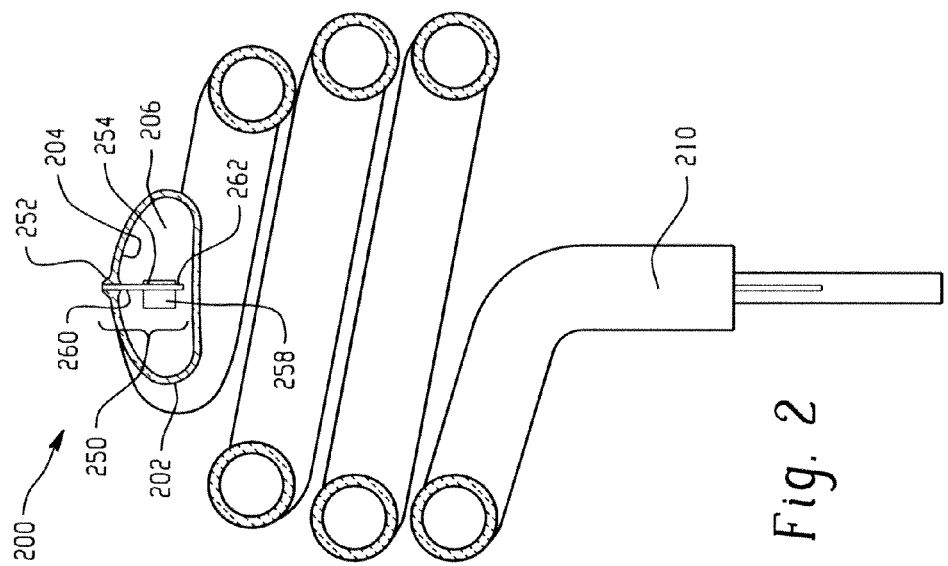
FIG. 2 is a partial cross-sectional view of a compact fluorescent lamp including an auxiliary amalgam assembly in accordance with an exemplary embodiment.
Figure 3:
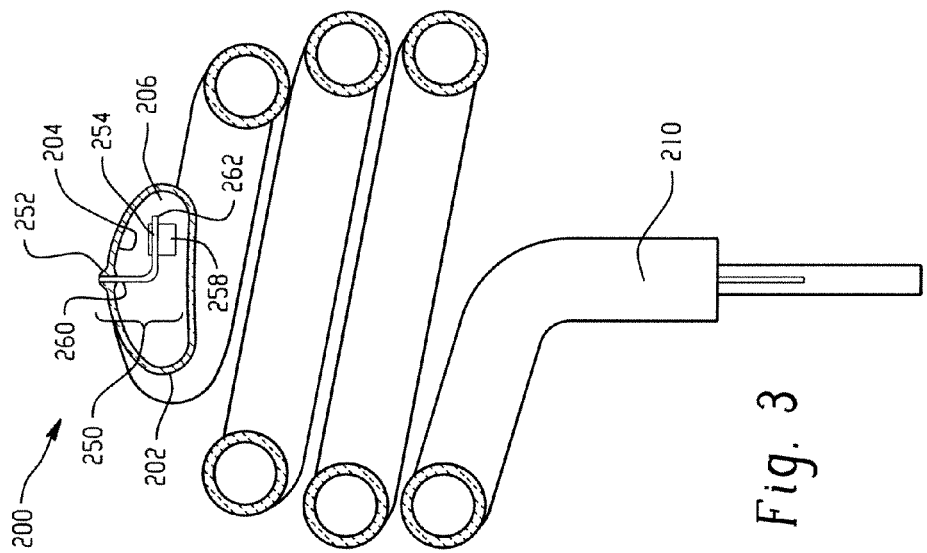
FIG. 3 is a partial cross-sectional view of a compact fluorescent lamp including an auxiliary amalgam assembly in accordance with an exemplary embodiment.

With regard to FIGS. 2 and 3, a compact fluorescent lamp 200 is shown. It is to be appreciated that lamp 200 includes many similar features as previously described in connection with lamp 100 so that like reference numerals and components in the "200" series refer to like numerals and components in the "100" series of the FIG. 1 embodiment. In an embodiment, an auxiliary amalgam assembly 250 is provided within the discharge chamber 206 at an intermediate region between the cathodes. The intermediate region is approximately midway between the first and second cathodes in the preferred embodiment.

The auxiliary amalgam assembly 250 is preferably secured by a bead structure 252 in the discharge chamber 206. The term "bead" as used herein refers to any structure included as part of the auxiliary amalgam assembly that functions to secure the assembly at a specified location within the discharge tube. The auxiliary amalgam assembly 250 includes a wire-like portion 254 for positioning the auxiliary amalgam 258 in the discharge chamber 206 at a location spaced from the discharge wall 204. The wire-like portion 254 has a proximal end 260 and a distal end 262. Specifically, the auxiliary amalgam is a generally planar wire mesh member 258 such as a rectangular or square component attached to the distal end 262 of the wire-like portion 254 of the assembly. Of course one skilled in the art will recognize that the generally planar wire mesh member 258 can vary in shape and size. The assembly or mount structure and auxiliary amalgam are shaped like, and generally described as, a "flag-shape" auxiliary amalgam assembly. However, other configurations may prove suitable.

The auxiliary amalgam 258 controls the mercury vapor pressure during a starting period of the lamp. Impacting electrons heat up the auxiliary amalgam member 258 which is located in the path of the arc discharge enough to generate mercury vapor pressure in the discharge lamp and thereby improve warm up characteristics of the lamp. The auxiliary amalgam 258 also absorbs mercury during non-discharge period, i.e., when the temperature is reduced at the cathode which is in a non-discharge state during this period.

Figure 4:
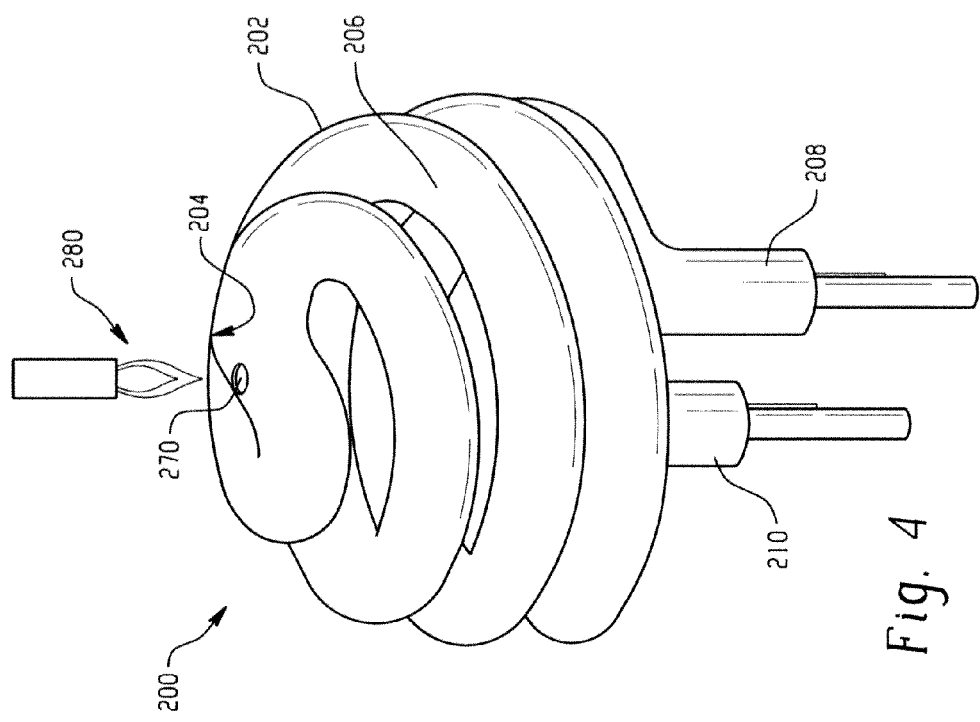
FIGS. 4-12 illustrate assembly steps of incorporating an auxiliary amalgam assembly into a compact fluorescent lamp.

With regard to FIGS. 4-10, steps in the assembly or manufacture of compact fluorescent lamp 200 is shown and a method of positioning an auxiliary amalgam is provided. In FIG. 4, a spiral discharge tube arrangement 202 includes a wall 204 which forms a discharge chamber 206 between first and second cathodes (not shown) at opposite ends 208, 210 of the discharge chamber 206. An opening 270 in the wall between the ends 208, 210 is formed in the surface of the discharge tube 202. In this preferred arrangement, the opening is formed by using heat as represented by flame 280 or etching the surface of the discharge tube although other similar methods of forming the opening may be used without departing from the scope and intent of the present disclosure. The opening 270 formed on the surface of the discharge tube 202 may be any shape that will admit or allow placement of the auxiliary amalgam into the discharge tube. For example, in some embodiments, the opening may be cylindrical or ellipsoidal in shape. The second end 210 is plugged or closed-off. Air is blown through the first end 208 in order to remove the material surface to form the opening 270.

Figure 7:
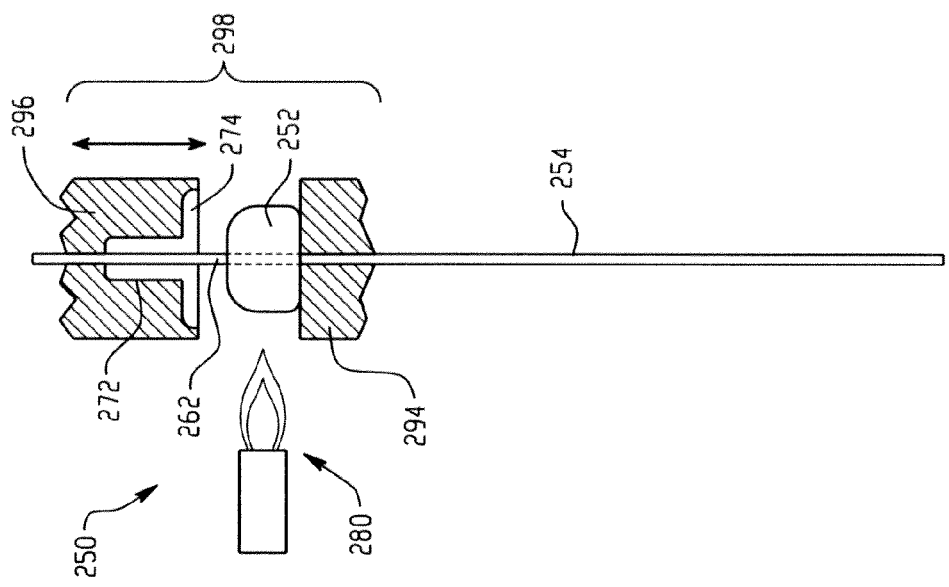
Figure 6:
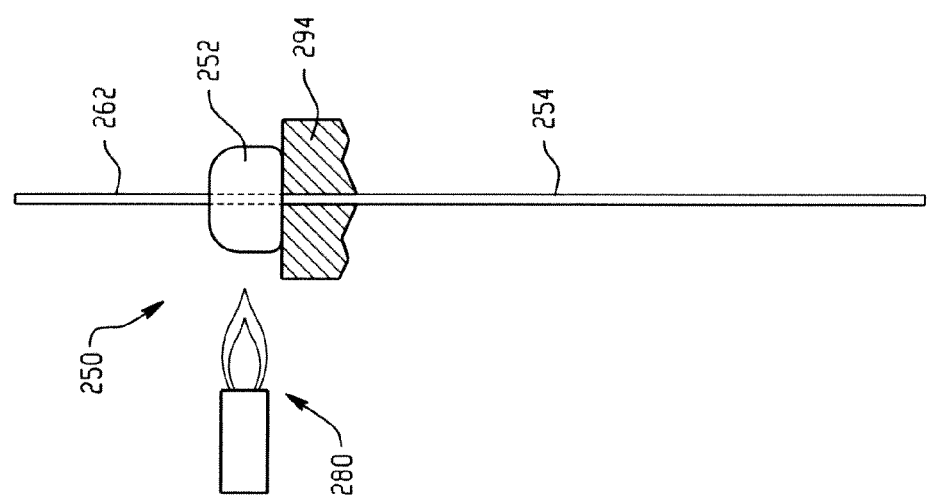
Figure 5:
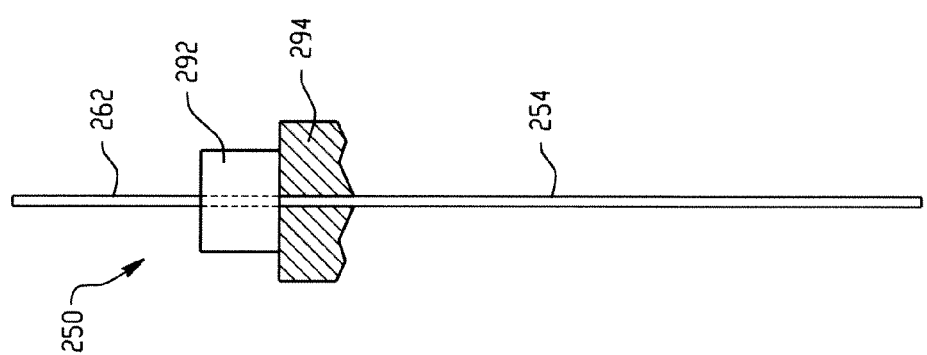
Figure 9:
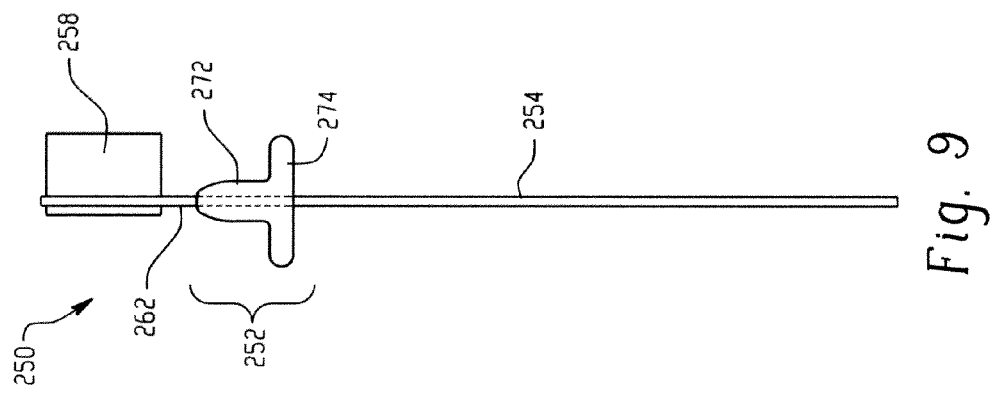
Figure 8:
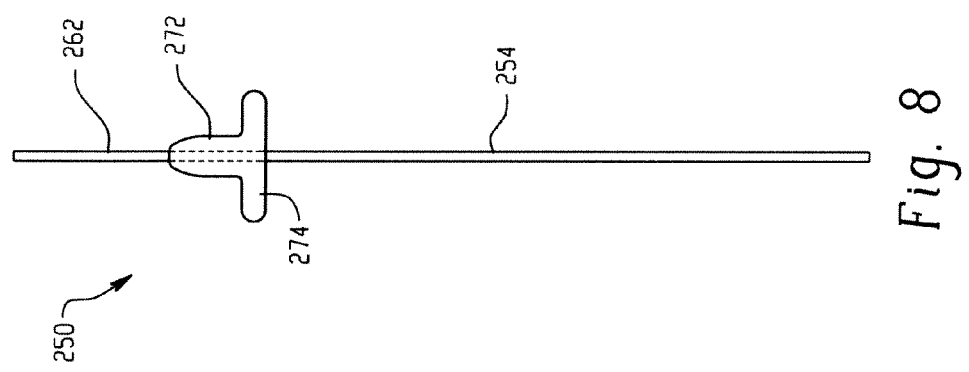

With regard to FIGS. 5-9, greater detail of the manufacture and placement auxiliary amalgam assembly 250 is shown. In FIG. 5, the mounting step includes cutting a glass tube 292 to sit on a molded production form 254. Suitable materials for forming the tube 252 include transparent materials such as quartz glass, and other vitreous materials, although translucent materials, such as ceramic materials, are also contemplated. The glass tube 292 is attached at or adjacent to the distal end 262 of the wire-like portion 254. In FIG. 6, the glass tube 292 (as shown in FIG. 5) is reformed into a bead 252 using heat as represented by flame 280, although other similar methods of reforming the glass tube 292 may be used without departing from the scope and intent of the present disclosure. In FIG. 7, a mold 296 that includes having a shape with a nose-like portion 272 and a disk-like portion 274 is positioned above the glass bead 252. The bead forming assembly 298 is then heated, for example using heat (as represented by flame 280 in FIG. 7) applied to the glass bead 252. This softens the material whereby the glass bead 252 of FIG. 7 adapts the conformation of the mold cavity 274. In FIG. 8, the glass bead 252 has the shape of a nose-like portion 272 and disk-like portion 274 similar to the molded production form 296. The production molds 294, 296 are removed from the distal end 262 of the wire-like portion 254. In FIG. 9, the auxiliary amalgam 258 is then positioned and joined to the distal end 262 of the wire-like portion 254 of the auxiliary amalgam assembly 250.

Figure 10:
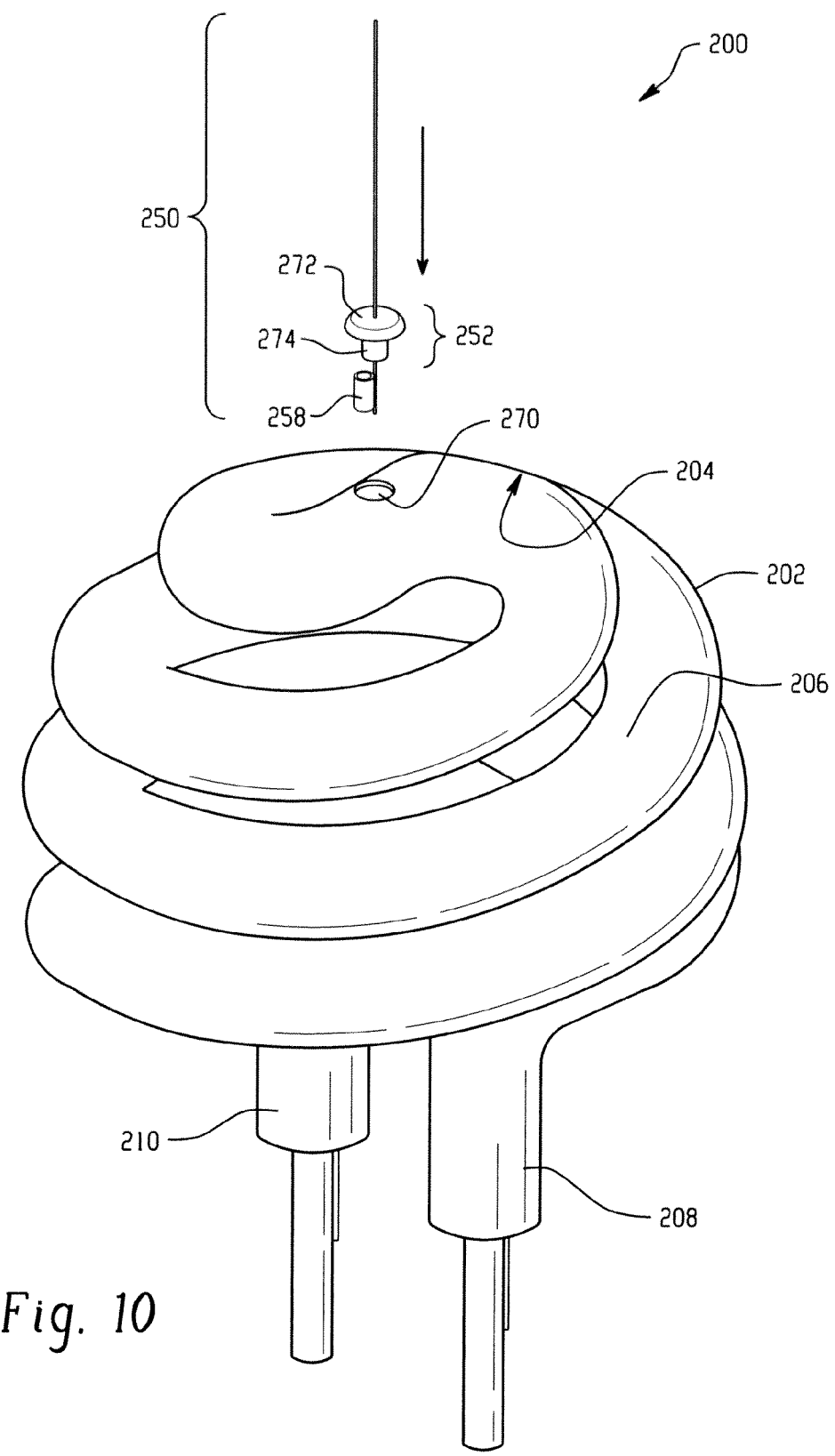

In FIG. 10, the auxiliary amalgam 258 is then introduced through the opening 270 formed in the discharge tube, preferably located at an intermediate region between the cathodes. As a result, the auxiliary amalgam (and notably mercury) is specifically introduced and dispensed more quickly throughout the length of the discharge tube. The opening 270 is then closed by the bead 252.

Figure 11:
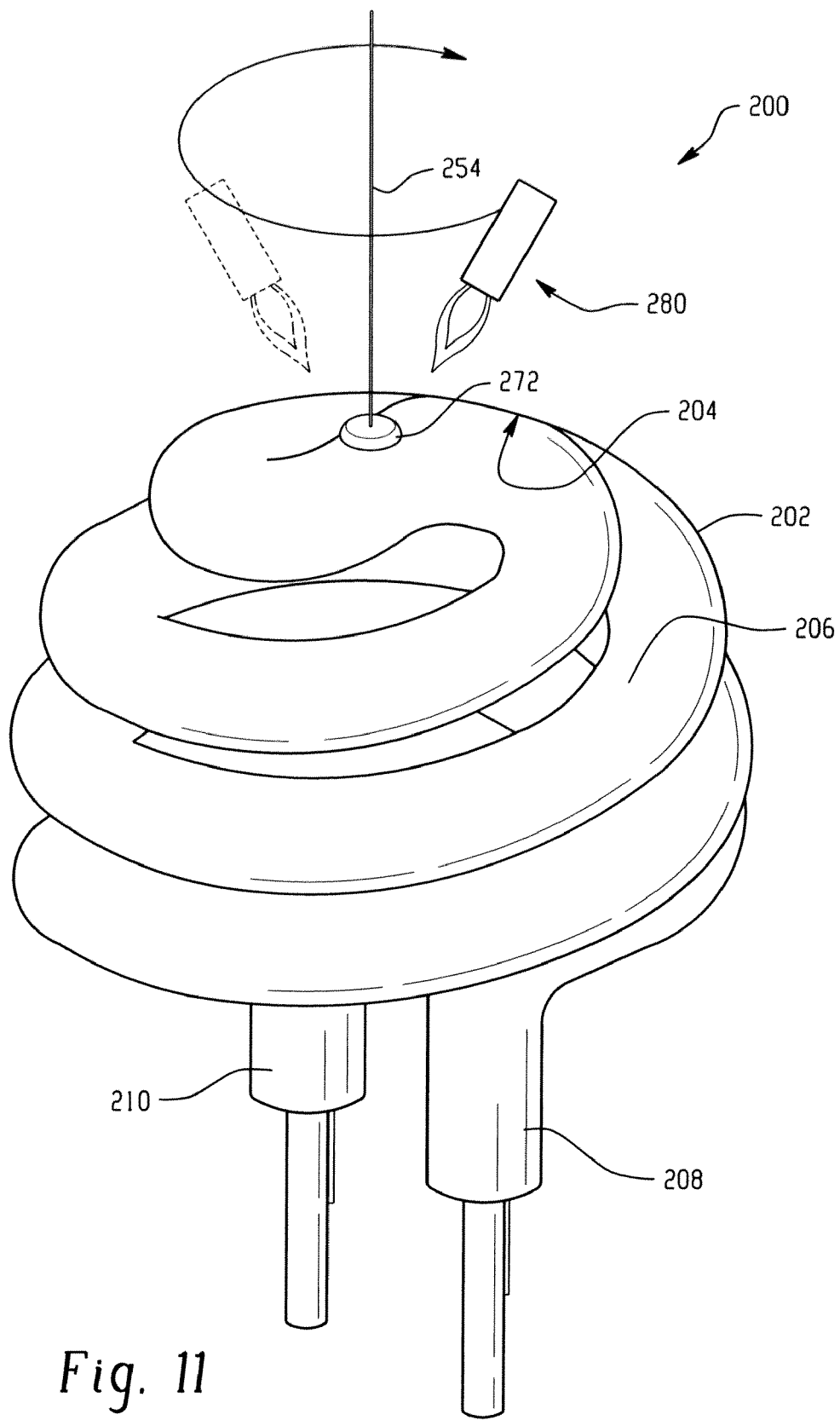

In FIG. 11, the sealing step includes sealing the opening 270. A preferred manner of sealing the opening 270 includes melting the bead 252 using heat 280 to fuse a perimeter of the disc-like portion 272 of the bead 252 with the surrounding wall of the discharge chamber 204, although other similar methods of sealing the opening may be used without departing from the scope and intent of the present disclosure.

Figure 12:
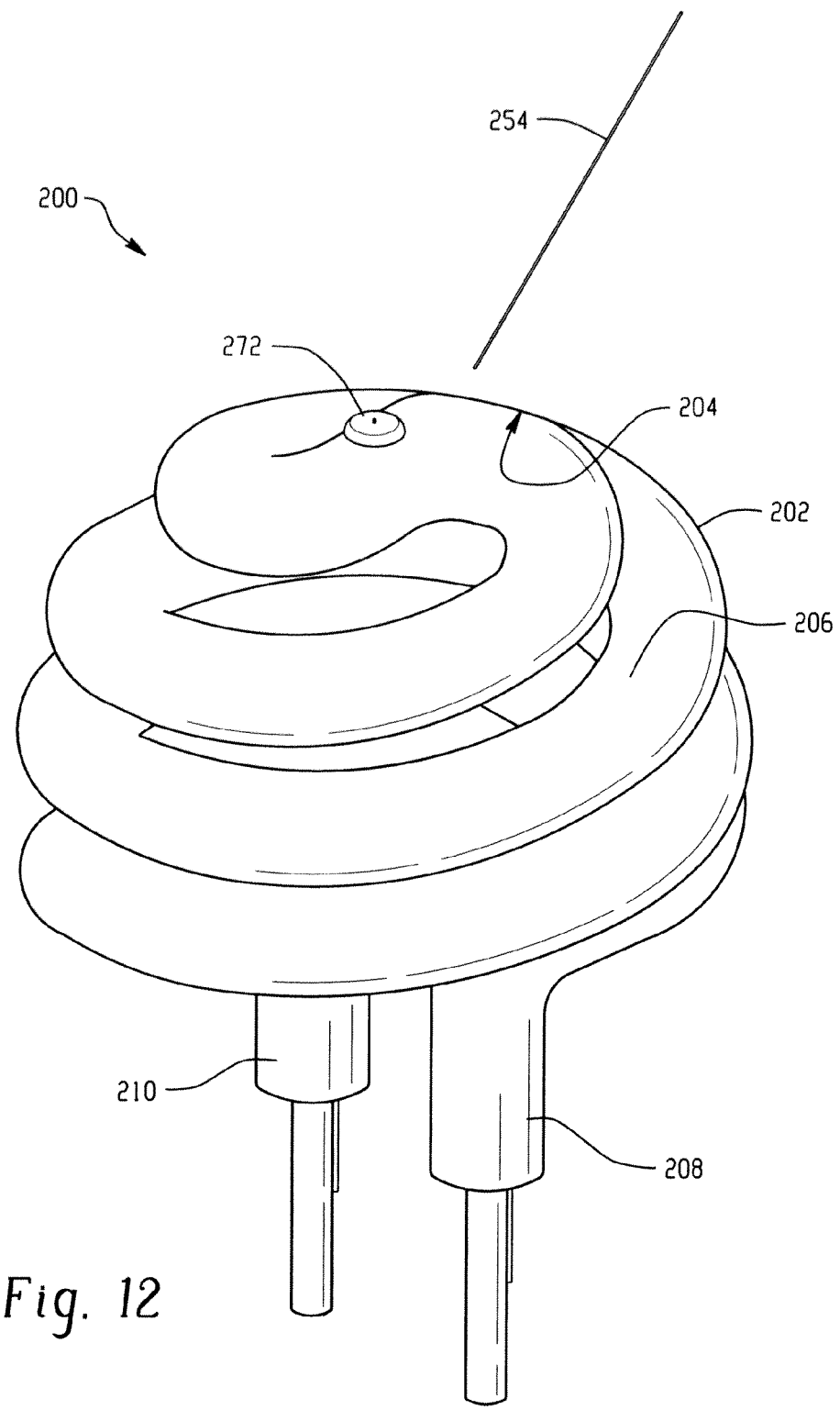

In FIG. 12, the mounting step includes subsequently removing any excess of the wire-like member 254 after merging the disc-like portion 272 of the bead 252 within the wall 204 of the discharge chamber 208. Once the heat fuses the plug in the wall opening, the wire-like member 254 is cut or trimmed at the external surface of the discharge chamber, although, it may be appreciated that some wire length may remain.

The disclosure has been described with reference to the preferred embodiments. Obviously, modifications and alterations will occur to others upon reading and understanding the preceding detailed description. In another embodiment, first and second auxiliary amalgam assemblies may be provided within the discharge chamber 206 adjacent the first and second cathodes (not shown) respectively. In yet another embodiment, the spiral discharge tube 202 may be generally a double helix arrangement and the auxiliary amalgam assembly 250 is located near a juncture between the first and second helixes. In still another embodiment, the auxiliary amalgam assembly is offset from a central axis of the discharge chamber 206. It is intended that the disclosure be construed as including all such modifications and alterations.

What is claimed is:

1. A compact fluorescent lamp comprising:
a discharge tube having a wall forming a discharge chamber between cathodes at first and second ends thereof;
at least one auxiliary amalgam disposed in the discharge chamber at an intermediate region between the first and second ends; and
an auxiliary amalgam securing assembly that secures the auxiliary amalgam at a location spaced from the inner wall of the discharge chamber, the securing assembly including a wire-like portion extending inwardly from the wall of the discharge chamber and extending at least partially through the wall, and an enlarged disk portion fused to an outer surface of the wall.

2. The compact fluorescent lamp of claim 1 wherein the intermediate region is approximately midway between the first and second cathodes.

3. The compact fluorescent lamp of claim 1 wherein the auxiliary amalgam is located at a distal end of the wire-like portion of the securing assembly spaced from the discharge tube wall.

4. The compact fluorescent lamp of claim 1, further comprising first and second auxiliary amalgam assemblies located adjacent the first and second cathodes respectfully.

5. The compact fluorescent lamp of claim 1 wherein the discharge tube is generally a double helix having a first helix and a second helix and the auxiliary amalgam is located near a juncture between the first and second helixes.

6. The compact fluorescent lamp of claim 1 wherein the auxiliary amalgam is offset from a central axis of the discharge chamber.

7. A method of positioning an auxiliary amalgam in a compact fluorescent lamp comprising:
providing a spiral discharge tube having a wall forming a discharge chamber between first and second cathodes at opposite ends of the discharge chamber;
forming an opening in the wall between the ends;
mounting an auxiliary amalgam on an elongated wire;
forming a bead to have a nose-like portion having a first dimension for receipt through the wall opening and a disk-like portion having a second dimension greater than the wall opening
positioning an auxiliary amalgam through the opening at a location spaced from the inner wall of the discharge tube; and
sealing the opening with the disk-like portion.

8. The method of claim 7 wherein the opening forming step includes enlarging the opening by using heat and blowing air through the opening.

9. The method of claim 7 wherein the sealing step includes sealing the opening and melting the disk-like portion of the bead into the discharge chamber to form one continuous surface.

10. The method of claim 7 wherein the mounting step includes removing an excess wire-like member after merging the disk-like portion of the bead and the discharge chamber.

11. A compact fluorescent lamp comprising:
a spiral discharge tube having a wall that forms a discharge chamber between cathodes at first and second ends thereof;
an auxiliary amalgam disposed in the discharge chamber between the first and second ends approximately midway between the first and second cathodes, and
an auxiliary amalgam securing assembly that secures the auxiliary amalgam at a location spaced from a sidewall in the discharge tube; and
wherein the auxiliary amalgam securing assembly includes a wire-like portion extending from the wall for positioning the auxiliary amalgam in the discharge chamber and a bead on the wire-like portion having a disk-like portion fused to the wall and from which the wire-like portion protrudes through the wall and extends into the discharge chamber.

12. The compact fluorescent lamp of claim 11 wherein the auxiliary amalgam is located at a distal end of the wire-like portion of the securing assembly spaced from the discharge tube wall.

13. The compact fluorescent lamp of claim 11, further comprising first and second auxiliary amalgam assemblies located adjacent the first and second cathodes respectfully.

14. The compact fluorescent lamp of claim 11 wherein the spiral discharge tube is generally a double helix that includes a first helix and a second helix and the auxiliary amalgam is located adjacent a juncture between the first and second helixes.

15. The compact fluorescent lamp of claim 11 wherein the auxiliary amalgam is offset from a central axis of the discharge chamber.

* * * * *